(12) United States Patent
Morgan et al.

(10) Patent No.: US 6,768,935 B1
(45) Date of Patent: Jul. 27, 2004

(54) VEHICLE DIAGNOSTIC RECORD MAPPING

(75) Inventors: Alexander P. Morgan, Birmingham, MI (US); Lawrence M. Quinn, Macomb, MI (US); Gulcin Sengir, Bloomfield Hills, MI (US); Diane I. Gibbons, Troy, MI (US); Michael A. Sowa, Clinton Township, MI (US); Stephen L. Falko, Southfield, MI (US); Frederick J. Vondrak, Livonia, MI (US); Thorsten W. Rommel, Mainz (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/408,848

(22) Filed: Apr. 7, 2003

(51) Int. Cl.[7] .......................... G06F 7/00; G01M 17/00
(52) U.S. Cl. .......................................... 701/29; 701/35
(58) Field of Search .............................. 701/29, 30, 32, 701/34, 35; 702/183, 187, 188

(56) References Cited

U.S. PATENT DOCUMENTS

| | | | | |
|---|---|---|---|---|
| 5,541,840 A | * | 7/1996 | Gurne et al. .................. | 701/33 |
| 5,542,024 A | | 7/1996 | Balint et al. ................. | 395/161 |
| 5,546,507 A | | 8/1996 | Staub .......................... | 395/76 |
| 5,918,240 A | | 6/1999 | Kupiec et al. ............... | 707/531 |
| 6,205,456 B1 | | 3/2001 | Nakao ......................... | 707/531 |
| 6,374,261 B1 | | 4/2002 | Alvarez et al. ............. | 707/200 |
| 6,389,337 B1 | * | 5/2002 | Kolls .......................... | 701/29 |
| 6,405,162 B1 | | 6/2002 | Segond et al. ................ | 704/9 |
| 6,449,539 B1 | * | 9/2002 | Ohno et al. .................... | 701/31 |

OTHER PUBLICATIONS

US Publication No. US 2003/0014383A1, Jan. 2003, Cho et al. "Techniques for Facilitating information acquisition and storage".

Lakemeyer, Gerhard; Nebel, Bernhard: Exploring Artificial Intelligence in the New Millennium, Chapter 3, "Natural Language Understandingj", pp. 69–102.

Weiss, Sholom; Indurkhya, Nitin, Predictive Data Mining, A Practical Guide, pp. 4–6.

* cited by examiner

Primary Examiner—Yonel Beaulieu
(74) Attorney, Agent, or Firm—Kathryn A. Marra

(57) ABSTRACT

A method for vehicle diagnostic record mapping comprising receiving a vehicle service record. A target record is created in response to receiving the vehicle service record. The target record includes a target-record number attribute, a set of vehicle-description attributes, a set of bookkeeping attributes, a set of system attributes, a set of symptom attributes, and a set of action attributes. Vehicle description data is mapped into the set of vehicle-description attributes in response to locating the vehicle description data in the vehicle service record. Bookkeeping data is mapped into the set of bookkeeping attributes in response to locating the bookkeeping data in the vehicle service record. Vehicle system data is mapped into the set of system attributes in response to locating the system data in the vehicle service record. Symptom data is mapped into the set of symptom attributes in response to locating the symptom data in the vehicle service record. Action data is mapped into the set of action attributes in response to locating the action data in the vehicle service record.

19 Claims, 5 Drawing Sheets

210 — TARGET-RECORD NUMBER
220 — VEHICLE DESCRIPTION
  VIN
  VEH YR
  VEH LINE
  VIN MODEL
  VIN MAKE
  VIN SERIES
  VIN BODY
  VIN ENGINE
  VIN YR
  VIN PLANT
  VIN SERIAL
  MILEAGE
230 — BOOKKEEPING
  DATE AUTHORED
  DATE EDITED
  AUTHOR/EDITOR
  BULLETINS
  RECORD NUMBER
  TARGET-RECORD STATUS
  RELEASE AUTHORIZER
  LANGUAGE
240 — SYSTEM
  SERVICE CATEGORY TYPE
  SERVICE CATEGORY
  SERVICE SUB-CATEGORY
250 — SYMPTOM
  MAIN SYMPTOM GROUP
  SYMPTOM
  SYMPTOM DETAIL
  FUNCTIONAL COMPONENT/SYSTEM
  FUNCTIONAL COMPONENT/SYSTEM DETAIL
  FREQUENCY
  ENVIRONMENT CONDITION
  VEHICLE CONDITION
  VEHICLE ZONE
  DTC
  DTC QUALIFIER
  ADDITIONAL SYMPTOM COMMENTS
260 — ACTION
  ACTION TAKEN
  COMPONENT NAME
  COMPONENT LOCATION
  COMPONENT PIECE OF
  COMPONENT DETAIL
  LABOR OPS
  ADDITIONAL ACTION COMMENTS

*FIG. 2*

410 — HEADING INFORMATION
    VIN - *1GMDX03E0VD211750*
    VEHICLE YEAR - *1997*
    MAKE - *CHEVROLET*
    MODEL - *VENTURE APV*
    ENGINE - *3.4L V6 MFI*
    MILEAGE - *43852*
    DATE ENTERED - *01-Mar-00*
    USER ID UPDATED - *HZKD7D*
    CASE NUMBER - *3776537*
    SERVICE MANUAL SECTION - *Restraints*
    SUBSECTION - *Supplemental Inflatable Restraints*
    COMPONENT TYPE - *(null)*
    MAIN SYMPTOM GROUP - *Indicator On*

420 — TEXT
    STRATEGY BASED DIAGNOSTICS
    _2_ *Number of times in for the same condition*
    _4_ *Number of days vehicle in dealership for same condition*
    _Y_ *(Y/N) Is the vehicle in the dealership*
    _N_ *(Y/N) Is the vehicle modified/non-production accessories (if yes list)*
    _Y_ *(Y/N) Can complaint be duplicated (if yes, freq., hot, cold, etc.)*
    _N_ *(Y/N) Have you compared this with an identical vehicle*
    _N_ *(Y/N) Can you isolate the area of the customers complaint*
    _Y_ *(Y/N) S/M search completed (if yes, list section, pg.)*
    _Y_ *(Y/N) Bulletin or PI search performed:*
    _Y_ *(Y/N) Is the customer concern the same as symptom description (if no list)*
    _Y_ *(Y/N) Condition details (list dtc's, etc.)*
    _Y_ *(Y/N) Diagnosis (parts replaced, veh. history, etc.)*
    TECH TOM BILLINGS STS SIR LAMP FLASHES 7 TIMES AND STAYS ON. DLR REPLACED DRIVERS INFLATOR MODULE AND SDM LAST VISIT. WAS OK FOR SEVERAL WEEKS. CODE RESET. DLR STS FLOW CHART FOR CODE 24 IS INCORRECT AND IS LEADING HIM TO INSTALL ANOTHER DRIVERS MODULE. DLR DID FIND A CHAFFED WIRE (CKT 347) AT LEFT FLOOR AREA.
    ADVISE:
    1. UNPLUG CONNECTOR AT BASE OF COLUMN AND UNPLUG SDM. CK FOR CONTINUITY TO GROUND ON CKTS 347 AND 348 WHILE MANIPULATING HARNESS.
    2. COMPARE DRIVER SENSE LOW VALUE TO A KNOWN GOOD VEHICLE.
    3. IF ALL OK, REPLACE SDM.

430 — RESOLUTION TEXT SUMMARY
    DLR TECH TOM REPORTS FINDING WIRES CHAFFED BY THE STUD AT THE DRIVERS FLOOR. REPAIRED AND REPLACED CKT 347 AND SDM

*FIG. 4*

510 — TARGET RECORD NUMBER - *54321*

520 — VEHICLE DESCRIPTION
    VIN - *1GMDX03E0VD211750*
    VEH YR - *1997*
    VIN MAKE - *CHEVROLET*
    VIN MODEL - *VENTURE APV*
    VIN ENGINE - *3.4L V6 MFI*
    MILEAGE - *43852*

530 — BOOKKEEPING
    DATE AUTHORED - *01-Mar-00*
    AUTHOR/EDITOR - *HZKD7D*
    TAC RECORD NUMBER - *3776537*

540 — SYSTEM
    SERVICE CATEGORY TYPE - *Restraints*
    SERVICE CATEGORY - *Supplemental Inflatable Restraints*
    SERVICE SUB-CATEGORY - *(null)*

550 — SYMPTOM
    MAIN SYMPTOM GROUP - *Indicator On*
    SYMPTOM - *Air Bag Light On*
    SYMPTOM DETAIL - *(null)*
    FUNCTIONAL COMPONENT/SYSTEM – *Air Bag*
    FUNCTIONAL COMPONENT/SYSTEM DETAIL – *Left Front/Driver*
    FREQUENCY – *Always*
    ENVIRONMENT CONDITION - *(null)*
    VEHICLE CONDITION - *(null)*
    VEHICLE ZONE - *(null)*
    DTC (Diagnostic Trouble Code) – *24*
    DTC QUALIFIER – *Current*
    ADDITIONAL SYMPTOM COMMENTS - *Replaced driver inflator module and SDM. OK for several weeks, then code reset. Found a chaffed wire (CKT 347) at left floor area.*

560 — ACTION
    ACTION TAKEN - *Repair, Replace*
    COMPONENT NAME - *Wiring harness circuit 347, Sensing and Diagnostic Module (SDM)*
    COMPONENT LOCATION - *Left front floor stud*
    COMPONENT PIECE OF - *(null)*

*FIG. 5*

VEHICLE DIAGNOSTIC RECORD MAPPING

BACKGROUND OF THE INVENTION

The present disclosure relates generally to vehicle diagnostic record mapping and in particular, to a method of mapping semi-structured vehicle diagnostic records into structured target records that may be utilized to assist in vehicle diagnostics.

Many automotive repair shops, including car dealerships and independent repair shops, have some form of computerized record keeping for vehicle diagnosis and repair. Records that contain data to explain the reason the car was brought in for service, the resulting diagnosis and the actions taken to service the vehicle are typically entered into a computer system. This information may be used to print detailed service information on the customer invoices as well as for service technicians to view detailed service records for a particular vehicle. In addition, the service record information may be accessed by other service technicians in the repair shop that are performing similar services on other vehicles. In many cases, a trade-off exists between collecting data that is reusable and making data entry as easy as possible for the service technician. To collect data that is reusable, the computer system could force the service technician to enter, or to select from a menu, specific terms to describe the vehicle, the symptoms and the actions taken. This data could then be saved in a structured target-record format within a database of vehicle diagnosis information. However, a service technician may prefer to enter free-text data. In this manner, the service technician can describe the problem as he sees it and not worry about trying to fit each piece of information into a particular category using a pre-defined vocabulary. Text-mining software may be utilized to search for particular words and phrases within a free-text document and to perform particular actions based on the results of the search. Rules, including the particular words and phrases, may be defined in advanced and the text-mining software can be instructed to choose among several meanings of a word based on context. Alternatively, the process of converting free-text data into a structured target record format could be performed by an expert who is familiar with vehicle diagnosis and the standard vocabulary.

Both of these approaches have pitfalls. For example, forcing the use of a controlled vocabulary and the entry of data only in structured attributes could lead to losing valuable insight into the diagnosis process because the service technician may not find a category that exactly matches the information he has acquired. In addition, the computer system might need frequent upgrades to account for new vehicle models and new service trends. Because data entry may be difficult and too structured, the service technician may not enter data into the system at all or the service technician may enter data that is incomplete or inaccurate. Using text-mining tools to extract information from free-text data may make it difficult to group and re-use the data because of a lack of standard terminology on which to base searches and groupings. Further, depending on the service technician entering the data, different categories of information may be entered, again making it difficult to consolidate data across records. These problems of inconsistent and incomplete data may be magnified when records from more than one repair facility are to be included in the database of structured service records.

BRIEF DESCRIPTION OF THE INVENTION

One aspect of the present invention is a method for vehicle diagnostic record mapping. In an exemplary embodiment, the method comprises receiving a vehicle service record. A target record is created in response to receiving the vehicle service record. The target record includes a target-record number attribute, a set of vehicle-description attributes, a set of bookkeeping attributes, a set of system attributes, a set of symptom attributes, and a set of action attributes. Vehicle description data is mapped into the set of vehicle-description attributes in response to locating the vehicle description data in the vehicle service record. Bookkeeping data is mapped into the set of bookkeeping attributes in response to locating the bookkeeping data in the vehicle service record. Vehicle system data is mapped into the set of system attributes in response to locating the system data in the vehicle service record. Symptom data is mapped into the set of symptom attributes in response to locating the symptom data in the vehicle service record. Action data is mapped into the set of action attributes in response to locating the action data in the vehicle service record.

In another aspect, a system for vehicle diagnostic record mapping comprises a network and a host system in communication with the network. The host system includes application software to implement a method for receiving a vehicle service record. A target record is created in response to receiving the vehicle service record. The target record includes a target-record number attribute, a set of vehicle-description attributes, a set of bookkeeping attributes, a set of system attributes, a set of symptom attributes, and a set of action attributes. Vehicle description data is mapped into the set of vehicle-description attributes in response to locating the vehicle description data in the vehicle service record. Bookkeeping data is mapped into the set of bookkeeping attributes in response to locating the bookkeeping data in the vehicle service record. Vehicle system data is mapped into the set of system attributes in response to locating the system data in the vehicle service record. Symptom data is mapped into the set of symptom attributes in response to locating the symptom data in the vehicle service record. Action data is mapped into the set of action attributes in response to locating the action data in the vehicle service record.

In a further aspect, a computer program product for vehicle diagnostic record mapping comprises a storage medium readable by a processing circuit and storing instructions for execution by the processing circuit for performing a method comprising receiving vehicle service record. A target record is created in response to receiving the vehicle service record. The target record includes a target-record number attribute, a set of vehicle-description attributes, a set of bookkeeping attributes, a set of system attributes, a set of symptom attributes, and a set of action attributes. Vehicle description data is mapped into the set of vehicle-description attributes in response to locating the vehicle description data in the vehicle service record. Bookkeeping data is mapped into the set of bookkeeping attributes in response to locating the bookkeeping data in the vehicle service record. Vehicle system data is mapped into the set of system attributes in response to locating the system data in the vehicle service record. Symptom data is mapped into the set of symptom attributes in response to locating the symptom data in the vehicle service record. Action data is mapped into the set of action attributes in response to locating the action data in the vehicle service record.

BRIEF DESCRIPTION OF THE DRAWINGS

Referring to the exemplary drawings wherein like elements are numbered alike in the several FIGURES:

FIG. 2 is an exemplary target-record format;

FIG. 4 is an exemplary semi-structured vehicle service record from a technical assistant center (TAC); and FIG. 5 is an exemplary target record that is the result of mapping the semi-structured vehicle service record depicted in FIG. 4 using an exemplary embodiment of the present invention.

DETAILED DESCRIPTION OF THE INVENTION

A method of vehicle diagnostic record mapping is presented. The target records created by an exemplary embodiment of the present invention may be utilized by a technician to assist in vehicle fault diagnosis. Target records that have a defined structure (e.g., structured records) are created from problem-solving records kept by technicians to document their work. These problem-solving records are generally unstructured or semi-structured records (e.g., free text or free text indexed with some key phrases). An exemplary embodiment of the present invention includes a mapping process that maps unstructured or semi-structured records into a database of structured target records that may be accessed by technicians in the field. Unstructured or semi-structured data may include items such as technical assistance center (TAC) phone logs, technician feedback records (i.e., feedback by technicians critiquing the quality of existing structured records), and warranty information records. A set of mapping rules is utilized to determine how the unstructured or semi-structured records will fill in the attributes of the structured target records. The mapping rules may capture and infer diagnostic knowledge from text. If an ontology is available, the rules may be guided by the ontology and by the structure of the structured records. An embodiment of the present invention is specialized to a vehicle diagnostics assistance application. As such, the mapping rules embody specialized technical knowledge of the service experts who developed it. The results of the mapping may need to be verified by human experts but an embodiment of the present invention offers significant improvements in speed and consistency over purely manual approaches.

Figure 1:
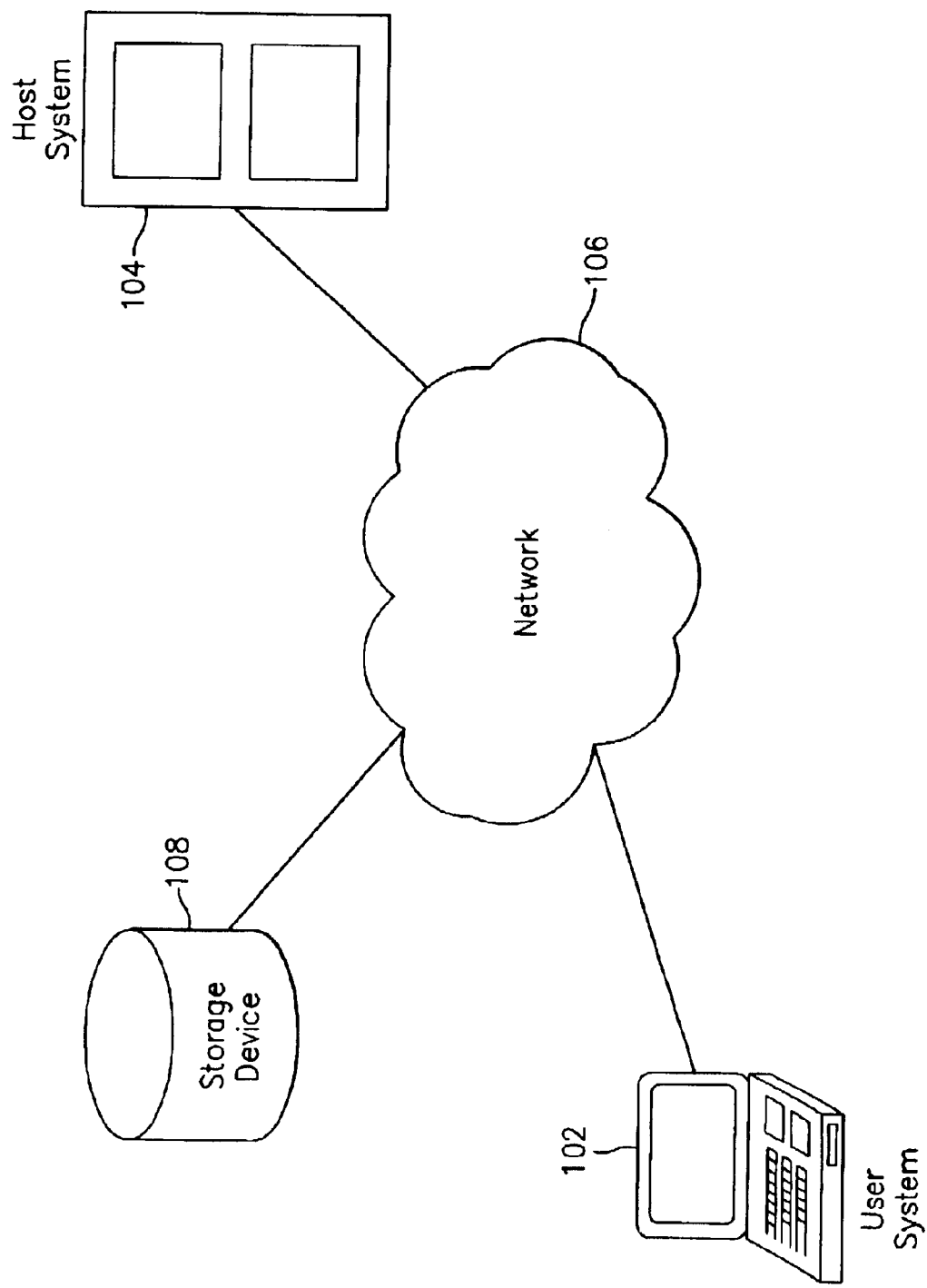
FIG. 1 is a block diagram of an exemplary system for performing vehicle diagnostic record mapping.

In FIG. 1, a block diagram of an exemplary system for performing vehicle diagnostic record mapping is generally shown. The system includes one or more user systems 102 through which users at one or more geographic locations may contact the host system 104 to initiate the execution of the mapping process, to verify the results of the mapping process and to edit the results of the mapping process if required. In an exemplary embodiment, the host system 104 executes the vehicle diagnostic record mapping application program and the user system 102 is coupled to the host system 104 via a network 106. Each user system 102 may be implemented using a general-purpose computer executing a computer program for carrying out the processes described herein. The user system 102 may be a personal computer (e.g., a lap top, a personal digital assistant) or a host attached terminal. If the user system 102 is a personal computer, the processing described herein may be shared by a user system 102 and the host system 104 (e.g., by providing an applet to the user system 102).

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In an exemplary embodiment, the user system 102 is connected directly (i.e., not via the network 106) to the host system 104 which executes the vehicle diagnostic record mapping software.

The storage device 108 may be implemented using a variety of devices for storing electronic information. It is understood that the storage device 108 may be implemented using memory contained in the host system 104 or it may be a separate physical device. The storage device 108 is logically addressable as a consolidated data source across a distributed environment that includes a network 106. The physical data may be located in a variety of geographic locations depending on application and access requirements. Information stored in the storage device 108 may be retrieved and manipulated via the host system 104. The storage device 108 includes a database of target records and one or more databases of unstructured or semi-structured service records. The storage device 108 may also include other kinds of data such as information concerning the mapping of the service records to target records (e.g., a user identifier, date, and time of mapping). In an exemplary embodiment, the host system 104 operates as a database server and coordinates access to application data including data stored on storage device 108.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software as is known in the art.

The host system 104 may also operate as an application server. The host system 104 executes one or more computer programs to perform vehicle diagnostic record mapping functions. The vehicle diagnostic record mapping software includes text-mining functions that may be provided by a commercial product. In an exemplary embodiment of the present invention, a commercial text-mining software tool is integrated in a seamless fashion with the rest of the functions provided by the vehicle diagnostic record mapping software. Processing may be shared by the user system 102 and the host system 104 by providing an application (e.g., java applet) to the user system 102. Alternatively, the user system 102 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

FIG. 2 is an exemplary target-record format. The exemplary target-record format includes a target-record number attribute 210. Also included in the target-record format is a set of vehicle-description attributes 220. As depicted in FIG. 2, the vehicle-description attributes 220 include: VIN (vehicle identification number); VEH YR (vehicle year); VEH LINE (vehicle line, e.g., Platform) for cars and S/T Trucks (2WD and 4WD small trucks and Sport Utility Vehicles)); VIN MODEL (e.g., Name); VIN MAKE (e.g., Division); VIN SERIES (e.g., Limited, Custom); VIN BODY (e.g., two door sedan, four door all purpose vehicle); VIN ENGINE (encodes displacement, configuration, and fuel system; e.g., 4.0 liter V8 Sequential Fuel Injection, 1.8 liter inline 4 cylinder Sequential Fuel Injection); VIN YR (vehicle year code); VIN PLANT (plant where vehicle was manufactured); VIN SERIAL (serial number of vehicle); and MILEAGE.

The target-record format depicted in FIG. 2 also includes a set of bookkeeping attributes 230. The bookkeeping attributes 230 include information about who entered the service record data and the status of the structured record. The bookkeeping attributes 230 include: DATE AUTHORED; DATE EDITED; AUTHOR/EDITOR; BULLETINS (bulletins related to the structured record); RECORD NUMBER (the sequence number of the source record utilized to create this structured record); TARGET-RECORD STATUS (e.g., is the target record released or unreleased); RELEASE AUTHORIZER; and LANGUAGE (e.g., English, German). An exemplary target-record format also includes a set of system attributes 240. The system attributes 240 contain information about the category of service described in the target-record format. The system attributes 240 include: SERVICE CATEGORY TYPE (the applicable service manual section, e.g., transmission); SERVICE CATEGORY (the applicable service manual subsection, e.g., automatic, manual); and SERVICE SUB-CATEGORY (identifies additional description of the service category, e.g., engine or transmission numbers such as 4T65-E, 4L80-E, NV3500, ZF56-650).

Also depicted in FIG. 2 are a set of symptom attributes 250. The first symptom attribute 250 in FIG. 2 is the MAIN SYMPTOM GROUP. The MAIN SYMPTOM GROUP attribute includes the service technician's classification of the symptoms (e.g., air leak, abnormal operation, concerns with fluids, indicator inoperative, indicator on, inoperative, noise, odor, unwanted operation or vibration). The SYMPTOM GROUP attribute may include data that reflects symptoms more specifically (e.g., air bag indicator on, engine has burning odor). Additional symptom attributes 250 include: SYMPTOM (the symptom or customer complaint); SYMPTOM DETAIL (adds to the symptom description, e.g., if SYMPTOM is noise, then SYMPTOM DETAIL might describe the type of noise); FUNCTIONAL COMPONENT/SYSTEM (which part of the vehicle is experiencing/causing the condition described by the MAIN SYMPTOM GROUP); FUNCTIONAL COMPONENT/SYSTEM DETAIL (additional information about the FUNCTIONAL COMPONENT/SYSTEM); FREQUENCY (frequency with which the problem is observed or experienced; e.g., intermittent, flashes); ENVIRONMENT CONDITION (describes the condition of the environment at the time the symptom is observed; e.g., raining, 95 degrees F.); and VEHICLE CONDITION (describes the operating conditions of the vehicle at the time the symptom is observed; e.g., just after starting, under load). Further symptom attributes 250 may include: VEHICLE ZONE (specific information that adds to the information already provided about the symptom, e.g., top, bottom, right-hand side); DTC (diagnostic trouble code, automatically generated by the electronics of the vehicle); DTC QUALIFIER (describes the status of the DTC, e.g., current, history, null, current and history); and ADDITIONAL SYMPTOM COMMENTS.

The target-record format depicted in FIG. 2 also includes a set of action attributes 260. The action attributes 260 include information about what service was performed in response to the service request or symptoms that generated the source record. The action attributes 260 include: ACTION TAKEN (the action taken to fix the problem); COMPONENT NAME; COMPONENT LOCATION (the location of the component being acted upon); COMPONENT PIECE OF (free-text that defines the piece of the component being acted upon); COMPONENT DETAIL (free-text that defines the component being acted upon in detail); LABOR OPS (labor operation codes); and ADDITIONAL ACTION COMMENTS.

Figure 3:
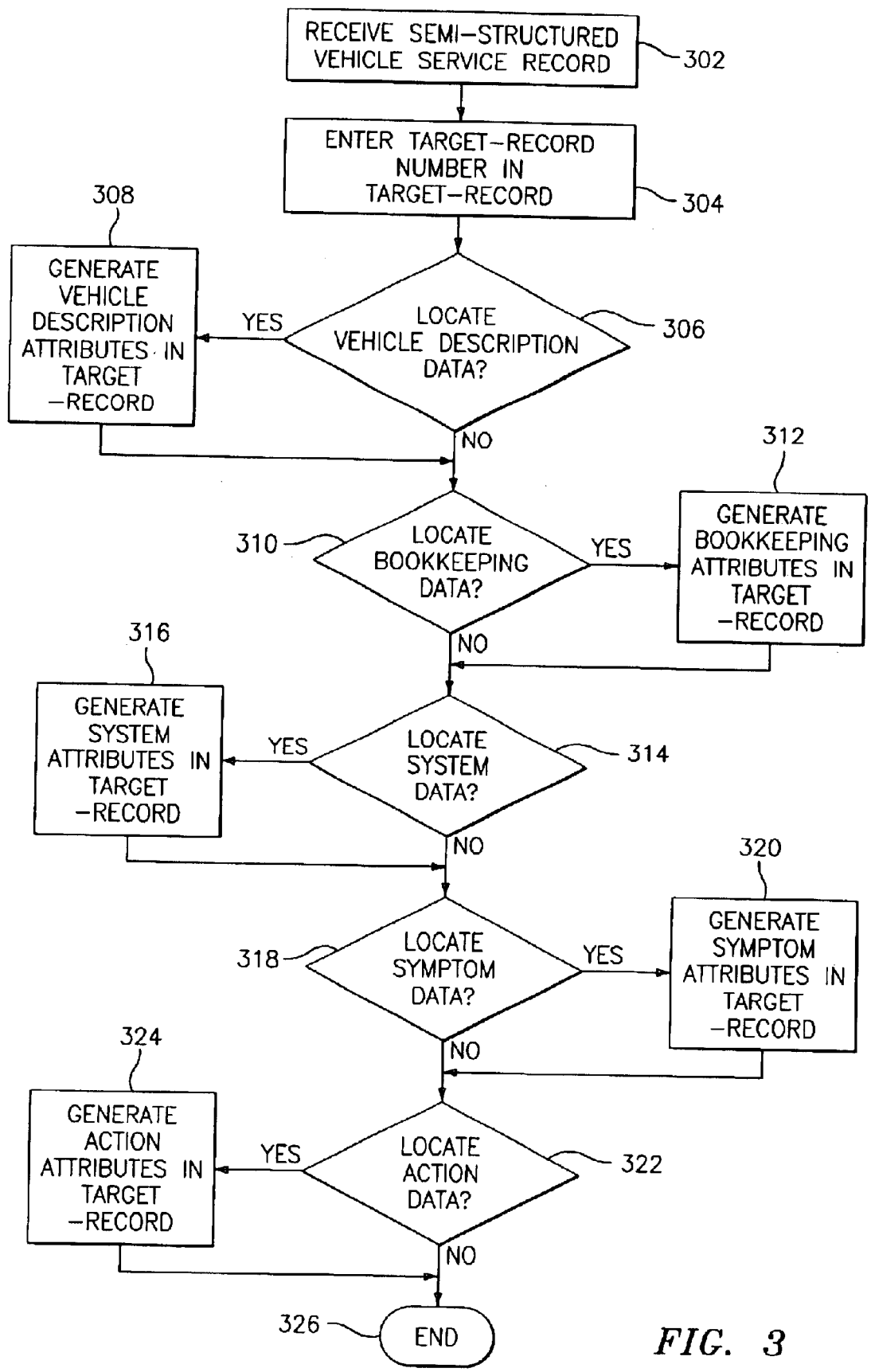
FIG. 3 is a flow diagram of an exemplary vehicle diagnostic record mapping process.

FIG. 3 is a flow diagram of an exemplary vehicle diagnostic record mapping process that can be utilized to convert a semi-structured service record, in this case a TAC service record, into a structured target record. The process begins at step 302, when a semi-structured vehicle service record is received. At step 304, a target-record number 210 is generated for the new target record. At step 306, the vehicle diagnostic record mapping application program attempts to locate vehicle-description data in the semi-structured service record. If vehicle-description data is located, as determined at step 306, then step 308 is performed, otherwise processing continues at step 310. At step 306, vehicle-description attributes 220 are generated in the target record. In an exemplary embodiment, where the semi-structured service record is a TAC service record, the vehicle-description attributes 220 for the target record are mapped directly from corresponding fields in the TAC service record. All vehicle description data contained in the service record fields are entered into the corresponding target-record attributes. One exception may be the VIN MAKE attribute, which may be created by copying the first three digits of the VIN field. Once step 308 is complete, processing continues with step 310. In this example, the data fields from the TAC service record map one-to-one with the corresponding attributes in the target record. However, this does not have to be the case and other mappings are possible. For example, all of the vehicle description 220 attributes may be deduced from the VIN, except mileage. The supplemental information needed to do this is available from a separate software application (e.g., VIN Decoder).

At step 310, the vehicle diagnostic record mapping application program attempts to locate bookkeeping data in the TAC service record. If bookkeeping data is located, then step 312 is performed to map the bookkeeping data into bookkeeping attributes 230 in the target-record format, otherwise processing continues with step 314. In an exemplary embodiment, the DATE AUTHORED, AUTHOR/EDITOR and RECORD NUMBER fields are sourced from the corresponding fields in the TAC service record. The BULLETINS field may be populated utilizing text-mining capabilities. Performing text-mining includes utilizing a text-mining software tool to inspect the free-text and keyword heading field portions of the TAC service record for standard terminology or for clues in the text in order to source an attribute in the target record. The use of a controlled vocabulary (ontology), including standard terms and phrases, when entering a TAC service record can expedite this process, but it is not required to implement an embodiment of the present invention. The BULLETINS field may be generated from the TAC record heading fields labeled "bulletin number" or "keyword qualifier" or "non-keyword qualifier", or alternatively, from the text portion of the TAC record. The TAC record "bulletin number" heading field is searched first and if a match is found, will be used to populate the BULLETINS field. Otherwise, text-mining will be utilized in an attempt to populate the BULLETINS field from the text or keyword heading fields (e,g., keyword qualifier, non-keyword qualifier).

Text-mining software may be instructed to look for bulletin numbers in the text and keyword heading fields in the form xxxxx, xx-xx-xx, xxxxxxxx, xx-xx-xx-xx, xxxxxxxxx, xx-xx-xx-xxx, yxxxxxx or yxxxxxxy where y is a letter and x is an integer. In addition, bulletin numbers may be preceded by "TSB" (Technical Service Bulletin), "PSB" (Published Service Bulletin), "SB" (Service Bulletin), "PI" (Preliminary Information), "SMU" (Service Manual Update), "Bulletin" or "Bull." Note, that the general rule implies that any 6, 8, or 9 digit number can represent a bulletin. If this is true, then there may be a conflict with other attributes (e.g., part number may be an 8 digit number) and the text-mining tool will have to determine the appropriate choice from the context of the text. More specific rules may be created for specific systems or components within the vehicle. For example, for an anti-lock brake system (ABS) the following rules may be utilized to identify bulletins: if the third character is "-", then the string represents a bulletin; and if the first two characters are "A0", then the string represents a bulletin. The remaining set of bookkeeping attributes 230 may contain default values. For example, DATE EDITED may default to blank and then be updated, if the record is edited; TARGET-RECORD STATUS may default to "unreleased"; RELEASE AUTHORIZER may default to blank and then be updated with the name of the service engineer who releases the case; and LANGUAGE may default to English. Once the set of bookkeeping attributes 230 is in the target-record format, step 312 is complete and processing continues at step 314.

At step 314, the vehicle diagnostic record mapping application program attempts to locate system data in the TAC service record. If system data is located, then step 316 is performed to map the system data into system attributes 240 of the target-record format, otherwise processing continues with step 318. In an exemplary embodiment, the SERVICE CATEGORY TYPE is sourced from the "service manual section" heading field and the SERVICE CATEGORY attribute is sourced from the "subsection" heading field in the TAC service record. The SERVICE SUB-CATEGORY attribute may be sourced from either the "component type" heading field, the "keyword qualifier" heading field, the "non-keyword qualifier" heading field or from the text data in the TAC service record. The SERVICE SUB-CATEGORY attribute identifies additional information about the SERVICE CATEGORY. The text-mining software may be instructed to locate this additional information, which may include data such as engine and transmission numbers.

At step 318, the vehicle diagnostic record mapping application program attempts to locate symptom data in the TAC service record. If symptom data is located, then step 318 is performed to map the symptom data into the set of symptom attributes 250 in the target-record format, otherwise processing continues with step 322. In an exemplary embodiment, the MAIN SYMPTOM GROUP attribute is sourced from a heading field in the TAC service record. This data may include phrases such as: air leak, abnormal operation, concerns with fluids, indicator inoperative, indicator on, inoperative, noise, odor, unwanted operation and vibration. The SYMPTOM attribute may be sourced from the keyword heading field in the TAC record or from the TAC text data. If the system is an ABS, then phrases that the text-mining software could be instructed to locate may include: light, lamp, indicator, LED, mil, pulsate, pulsation, unwanted activation, stall, and vehicle will not go over xxx mph. The SYMPTOM DETAIL field may be sourced from a heading field in the TAC record or from the TAC text data using text-mining capabilities. This information adds to the symptom description. For example, if the symptom is noise, then the symptom detail might describe the type of noise. For example, in an ABS system, the text-mining software may be instructed to locate the following phrases: buzz, chatter, chime, click, click-chatter, click-tick, clunk, growl, squeak, squeal and rattle. The text-mining software would also locate variations in spelling as well as misspellings of the previous list of phrases.

In an exemplary embodiment, the FUNCTIONAL COMPONENT/SYSTEM attribute of the target record indicates which part of the vehicle is experiencing/causing the condition described in the MAIN SYMPTOM GROUP. For example, if the MAIN SYMPTOM GROUP contains the value "indicator on", then the text-mining software will search to locate the specific indicator that is being referred to. In this example, the text-mining software may search for terms that include: antilock brake system, ABS, enhanced traction control, ETC, traction control system, TCS, low traction, low trac, service engine soon, SES, service vehicle soon, SVS, low tire pressure monitor, LTPM, low tire pressure warning system, LTPWS, brake, ABS active and traction off. Other phrases in the text and keyword heading fields may be specified for searching depending on factors such as whether the indicator is part of the instrument cluster, driver information center, secondary information center or navigation/radio display. As shown in the previous example, an embodiment of the present invention allows for the text-mining software to search for different phrases in the TAC service record text and keyword heading fields based on data values contained in one or more of the target record fields.

The FUNCTIONAL COMPONENT/SYSTEM DETAIL attribute in the set of symptom attributes 250 of the target record is sourced from the TAC service record text or keyword heading fields and contains further information about the FUNCTIONAL COMPONENT/SYSTEM. The FREQUENCY attribute describes the frequency with which the problem is observed or experienced. It may be sourced from a keyword heading field in the TAC record or from the TAC text data. Phrases that the text-mining software could be instructed to locate include: always, intermittent, flashing and flickers. The vehicle diagnostic record mapping software may be instructed to recognize various spellings and abbreviations of the word intermittent; may be directed to enter the word "always" in the FREQUENCY field in response to locating the terms always, constantly or constant in the text; and be instructed to recognize variants of phrases such as "1 time only", "2 days" (for 2 days) and erratic. The ENVIRONMENT CONDITION attribute describes the condition of the environment at the time the symptom is observed. This attribute may be generated from a keyword heading field in the TAC record or from the TAC text data using text-mining capabilities. The environment condition may be defined using terms such as hot, cold, rain, car wash and road surface. For example, HVAC cases may include a case where the symptom is cold draft from door handle and the ENVIRONMENT CONDITION attribute may include the data string "strong wind." The VEHICLE CONDITION attribute describes the operating conditions of the vehicle at the time the symptom is observed. Conditions may include hot, cold, under load, acceleration, deceleration, just after starting, parking maneuvers and highway speeds. Note that the hot and cold in this context refers to the condition of the vehicle and not the ambient air temperature. The VEHICLE CONDITION attribute may be sourced using a keyword heading field in the TAC service record or through using the text field in the TAC service record. The text-mining software may be instructed to recognize variations of: stop, start, turning, accelerating, MPH or KM/H to indicate speed at which the symptom occurs, bumps, turning, high speed, low speed, normal braking and ignition switch position.

The VEHICLE ZONE attribute in the set of symptom attributes 250 of the target record is sourced from a TAC service record keyword heading field or text and contains specific information that adds to the information already provided about the symptom. Values that the text-mining software may search for include: top, bottom, right-hand side and left-hand side. Also included in the set of symptom attributes 250 may be a DTC (diagnostic trouble code) associated with the record. In an exemplary system, using an ABS system as an example, the DTC field may be in the form yxxxx where y is B, C, P or U and x is any integer. In an exemplary embodiment the words "no codes" and "no dtc" will be recognized and be utilized to populate the DTC field with the phrase "NO DTC's" so that it can be recognized that there were actually no DTC's present, not simply that there were no DTC's recorded. In the case of an exemplary ABS system, several rules may be applied to the text-mining software in order to extract DTC data from the keyword heading fields or text. ABS rules for DTC data extraction may include: if the length of the string is five and the first character is a "C" and the second character is a numeric digit (0–9), then the string corresponds to a DTC; and if the length of the string is seven and the first character is a "C" and the second character is a numeric digit and the sixth character is an "E" or "M", then the string corresponds to a DTC. Also referring to exemplary ABS rules, sometimes the first alpha digit is not included in the text. To accommodate this, if the length of the string is four and the first character is a numeric digit, then the string corresponds to a DTC. The vehicle diagnostic record mapping software would then manipulate the data from the TAC service record by adding a "C" to the beginning of the four digit string to create a five digit DTC. Other rules for text-mining for an ABS system may include: if the first two characters are "P0", "P1", "U0" or "U1" then the string represents a DTC; if the string starts with "DTC", then it represents a DTC and is stored without the "DT" prefix (e.g., DTC1226 is stored in the structured record as C1226); and some two digit numeric strings represent DTC's, but two digit numeric strings may represent other information (e.g., vehicle speed, model year) and therefore assignments of two digit numeric strings to DTC's need to be evaluated in context (e.g., the presence of MPH in the field, for example will indicate that the number represents vehicle speed and probably belongs in the VEHICLE CONDITION category).

The DTC QUALIFIER attribute in the set of symptom attributes 250 describes the status of the DTC in terms of whether it represents an active error code or an error code generated in the past. The DTC QUALIFIER values may include: "current", "history", "null", or "current & history." This attribute will be populated using text-mining capabilities from the keyword heading fields or from the text in the TAC service record. Similarly, the field "SYMPTOM ADDITIONAL COMMENTS" will be populated, using text-mining capabilities, if additional comments relating to the symptom are identified.

At step 322, the vehicle diagnostic record mapping application program attempts to locate data about corrective or repair actions in the TAC service record. If such data is located, then step 324 is performed to map the action data into the set of action attributes 260 in the target-record format, otherwise processing continues with step 326. In an exemplary embodiment, the ACTION TAKEN, COMPONENT NAME, COMPONENT LOCATION, and COMPONENT PIECE OF attributes will be sourced from the keyword heading fields or from the text data in the TAC service record. Text-mining capabilities will be utilized to determine the appropriate entries for these attributes based on a list of approved phrases for each of these attributes. The COMPONENT DETAIL attribute will be populated with the free-text that defines the component in detail being acted upon. This attribute will be generated from the text data in the TAC service record utilizing text-mining capabilities. In an exemplary embodiment, where the TAC service record has to do with an ABS, the following rules can be utilized by the text-mining functions to locate and manipulate the data: if the first character is then the string represents a part number and drop the "#" for uniformity; if the first three characters are "p/n", then the string represents a part number; if the first two characters are "pn", then the string represents a part number; if the length of the string is eight and the first character is numeric, then the string corresponds to a part number if it makes sense contextually; and if the eighth character is an "R" and the character string is seventeen characters or less, then the string is a bar code type of part number. The LABOR OPS field may be source from the TAC heading field labeled "labor code." Finally, the ACTION ADDITIONAL COMMENTS attribute will be populated utilizing text-mining capabilities by searching the text data in the TAC service record for additional comments relating to the action attributes 260.

At step 326, the vehicle diagnostic record mapping is complete, and processing ends. The exemplary embodiment described in reference to FIGS. 2 and 3 is one where a semi-structured TAC service record is mapped into a target-record format. Target-record formats that differ from the one depicted in FIG. 2 may be utilized with an embodiment of the present invention; other attributes and sets of attributes may be added or existing ones may be eliminated based on user requirements. Similarly, the source for the mapping may be a TAC service record, as well as any other semi-structured or un structured service document including warranty information records and field feedback records. Each set of target records may be sourced from one or more types of semi-structure d or unstructured vehicle service records (e.g., TAC and warranty). Each type of vehicle service record may have a corresponding set of mapping and text-mining software rules that conform to local norms and result in the data being mapped into a common target-record format. In addition, it is not necessary for all attributes in the target record to be filled in with data values when the vehicle diagnostic record mapping process has been completed. Depending on the type of source records, some attributes may not be tracked, and depending on the data contained in the source records, data may not exist for every entry in the target record. The text-mining capabilities may be set up differently depending on the type of source records and the structure of the target records. In addition, the text-mining functions may be updated and fine-tuned based on the accuracy of the mapping results as well as in response to changes in terminology, technology, and practices by service technicians.

FIG. 4 is an exemplary subset of a semi-structured vehicle service record from a technical assistant center (TAC). It includes a heading information field 410, a text field 420 and a resolution text summary field 430. Both the text field 420 and the resolution text summary field 430 contain free-text that may be searched using text-mining capabilities. FIG. 5 is an exemplary subset of a target record that is the result of mapping the semi-structured service diagnostic record depicted in FIG. 4 using an exemplary embodiment of the present invention. As shown in FIGS. 4 and 5, the heading information field 410 is mapped directly into the corresponding attributes in the target record. Referring to FIG. 5, the following attributes are filled in with data directly from corresponding fields in the source record depicted in FIG. 4: all vehicle-description attributes 520, all bookkeeping attributes 530, all system attributes 540 (here, there are some name changes: SERVICE MANUAL SECTION to SERVICE CATEGORY TYPE, SUBSECTION to SERVICE CATEGORY, and COMPONENT TYPE to SERVICE SUBCATEGORY) and the MAIN SYMPTOM GROUP attribute in the set of symptom attributes 550. Further, the target-record number attribute 510 is generated as a part of the target-record authoring and maintenance process (and is not related to any data in the semi-structured service diagnostic record depicted in FIG. 4).

The other attributes in the target record depicted in FIG. 5 are filled in from the text field 420 and resolution text summary field 430 portions of the TAC service record shown in FIG. 4. This is accomplished by utilizing the text-mining capabilities described above. For example, because the service manual section is "restraints", the text-mining function searches for data related to restraints to enter into the SYMPTOM and SYMPTOM DETAIL attributes. The phrase "SIR LAMP FLASHES 7 TIMES AND STAYS ON" is changed to the agreed upon standard phrase "Air Bag Light On" in the SYMPTOM field on the target record. This manipulation of the data can provide consistency in describing the symptom and allow searching and grouping of like symptoms. Each implementation may utilize a different set of standard phrases depending on the standard language utilized or recommended when describing vehicle diagnostic data. Similarly, the FUNCTIONAL COMPONENT/SYSTEM attribute is filled in with "Air Bag," derived from the nature of the SYMPTOM. FUNCTIONAL COMPONENT/SYSTEM DETAIL is filled in with "Left Front/Driver," derived from DRIVERS in the text field 420 portion of the TAC service record and taken from standard phrases on file for this kind of symptom. In other words, because the SYMPTOM was "Air Bag," a particular subset of phrases, those related to air bag problems, may be scanned for by the text-mining functions of the vehicle diagnostic record mapping application. The result is that: "CODE 24" becomes "DTC (Diagnostic Trouble Code)—24"; the DTC QUALIFER is set to "Current" by default. The FREQUENCY attribute under the set of symptom attributes 550 in FIG. 5 is filled in with the word "Always," based on finding the word "STAYS ON" in the text field 420 in FIG. 4. The ADDITIONAL SYMPTOM COMMENTS are gleaned from the TEXT, focusing on diagnostic and repair verbs with associated noun phrases, as guided by the text mining logic.

The attributes listed under the set of action attributes 560 in FIG. 5 are filled in based on the results of applying text-mining capabilities to the data contained in the resolution text summary field 430 in FIG. 4. The resulting data in the ACTION TAKEN attribute under the set of action attributes 560 in FIG. 5 includes: "Repair, Replace" (derived from "REPAIRED AND REPLACED"). Similarly, the "COMPONENT NAME—Wiring harness circuit 347, Sensing and Diagnostic Module (SDM)" in FIG. 5 is derived from "CKT 347 AND SDM," and "COMPONENT LOCATION—Left front floor stud" is derived from "STUD AT THE DRIVERS FLOOR" in the resolution text summary 430 field in FIG. 4.

An embodiment of the present invention maps semi-structured and unstructured vehicle service records into a target-record format. This may result in making free-text information more useful by providing the ability to group, and eliminate redundancies among like service records and to sort and search on keywords contained in target-record attributes. This data may then be presented to technicians as a lessons learned database for use in diagnosing and servicing vehicles and provided to product developers for use in developing new products or product upgrades. In addition, an embodiment of the present invention furthers the use of a standard vocabulary by translating the phrases found in free-text into standard language phrases to be entered into the target record. The ability to automate the conversion of unstructured service data into structured target records may result in a cost savings when compared to performing the conversion manually. In addition, automating the process may lead to more consistent data in the target records. The ability to take previously solved problems that are documented only in unstructured text and convert them into a structured target record format allows previously solved problems to be leveraged in providing future vehicle diagnostic service. This may lead to improved service and improved diagnostic quality.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not to be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for vehicle diagnostic record mapping, said method comprising:
   receiving a vehicle service record;
   creating a target record in response to said receiving, wherein said target record includes a target-record number attribute, a set of vehicle-description attributes, a set of bookkeeping attributes, a set of system attributes, a set of symptom attributes, and a set of action attributes;
   mapping vehicle description data into said set of vehicle-description attributes in response to locating said vehicle description data in said vehicle service record;
   mapping bookkeeping data into said set of bookkeeping attributes in response to locating said bookkeeping data in said vehicle service record;
   mapping system data into said set of system attributes in response to locating said system data in said vehicle service record;
   mapping symptom data into said set of symptom attributes in response to locating said symptom data in said vehicle service record; and
   mapping action data into said set of action attributes in response to locating said action data in said vehicle service record.

2. The method of claim 1 wherein said locating is performed using text-mining.

3. The method of claim 1 wherein said locating is performed by matching a data field in said vehicle service record to one of said attributes in said target record.

4. The method of claim 1 wherein said mapping is performed by manipulating data from said vehicle service record into one of said attributes in said target record.

5. The method of claim 1 wherein said vehicle service record includes data in an unstructured format.

6. The method of claim 1 wherein said vehicle service record includes data in a semi-structured format.

7. The method of claim 1 wherein said vehicle service record includes data in a free-text format.

8. The method of claim 1 wherein said set of vehicle-description attributes includes a vehicle identification number attribute, a vehicle year attribute, a vehicle line attribute, a vehicle identification number model attribute, a vehicle identification number make attribute, a vehicle identification number series attribute, a vehicle identification number body attribute, a vehicle identification number engine attribute, a vehicle identification number year attribute, a vehicle identification number plant attribute, a vehicle identification number serial attribute and a mileage attribute.

9. The method of claim 1 wherein said set of vehicle-description attributes includes:
   a vehicle identification number attribute and a mileage attribute; or
   an attribute derivable from said vehicle identification number and said mileage attribute.

10. The method of claim 1 wherein said set of bookkeeping attributes includes a date authored attribute, a date edited attribute, an author/editor attribute, a bulletins attribute, a record number attribute, a target-record status attribute, a release authorizer attribute and a language attribute.

11. The method of claim 1 wherein said set of bookkeeping attributes includes at least one of a date authored attribute, a date edited attribute, an author/editor attribute, a bulletins attribute, a record number attribute, a target-record status attribute, a release authorizer attribute and a language attribute.

12. The method of claim 1 wherein said set of system attributes includes:
   a service category type attribute; or
   said service category type attribute and a service category attribute; or
   said service category type attribute, said service category attribute and a service sub-category attribute.

13. The method of claim 1 wherein said set of symptom attributes includes a main symptom group attribute, a symptom attribute, a symptom detail attribute, a functional component/system attribute, a functional component/system detail attribute, a frequency attribute, an environment condition attribute, a vehicle condition attribute, a vehicle zone attribute, a diagnostic trouble code attribute, a diagnostic trouble code qualifier attribute, and an additional symptom comments attribute.

14. The method of claim 1 wherein said set of symptom attributes includes a main symptom group attribute, a functional component/system attribute and a diagnostic trouble code attribute.

15. The method of claim 14 wherein said set of symptom attributes further includes at least one of a symptom attribute, a frequency attribute, an environment condition attribute, and a vehicle condition attribute.

16. The method of claim 1 wherein said set of action attributes includes an action taken attribute, a component name attribute, a component location attribute, a component piece of attribute, a component detail attribute, a labor operations attribute and an additional action comments attribute.

17. The method of claim 1 wherein said set of action attributes includes an action taken attribute and a component name attribute.

18. A system for vehicle diagnostic record mapping, the system comprising:
   a network; and
   a host system in communication with said network, said host system including application software to implement a method comprising:
   receiving a vehicle service record via said network;
   creating a target record in response to said receiving, wherein said target record includes a target-record number attribute, a set of vehicle-description attributes, a set of bookkeeping attributes, a set of system attributes, a set of symptom attributes, and a set of action attributes;
   mapping vehicle description data into said set of vehicle-description attributes in response to locating said vehicle description data in said vehicle service record;
   mapping bookkeeping data into said set of bookkeeping attributes in response to locating said bookkeeping data in said vehicle service record;
   mapping system data into said set of system attributes in response to locating said system data in said vehicle service record;
   mapping symptom data into said set of symptom attributes in response to locating said symptom data in said vehicle service record; and
   mapping action data into said set of action attributes in response to locating said action data in said vehicle service record.

19. A computer program product for vehicle diagnostic record mapping, the computer program product comprising:

a storage medium readable by a processing circuit and storing instructions for execution by the processing circuit for performing a method comprising:

receiving a vehicle service record;

creating a target record in response to said receiving, wherein said target record includes a target-record number attribute, a set of vehicled-description attributes, a set of bookkeeping attributes, a set of system attributes, a set of symptom attributes, and a sect of action attributes;

mapping vehicle description data into said set of vehicle-description attributes in response to locating said vehicle description data in said vehicle service record;

mapping bookkeeping data into said set of bookkeeping attributes in response to locating said bookkeeping data in said vehicle service record;

mapping system data into said set of system attributes in response to locating said system data in said vehicle service record;

mapping symptom data into said set of symptom attributes in response to locating said symptom data in said vehicle service record; and mapping action data into said set of action attributes in response to locating said action data in said vehicle service record.

* * * * *